US 6,637,187 B2

(12) United States Patent
Sanders et al.

(10) Patent No.: US 6,637,187 B2
(45) Date of Patent: Oct. 28, 2003

(54) ROTARY INLET FLOW CONTROLLER FOR PULSE DETONATION COMBUSTION ENGINES

(75) Inventors: Bobby W. Sanders, Westlake, OH (US); Lois J. Weir, North Canton, OH (US)

(73) Assignee: TechLand Research, Inc., North Olmstead, OH (US)

( * ) Notice: Subject to any disclaimer, the term of this patent is extended or adjusted under 35 U.S.C. 154(b) by 0 days.

(21) Appl. No.: 09/949,492

(22) Filed: Sep. 7, 2001

(65) Prior Publication Data

US 2003/0154707 A1 Aug. 21, 2003

Related U.S. Application Data

(60) Provisional application No. 60/231,261, filed on Sep. 8, 2000.

(51) Int. Cl.[7] .................................................. F02K 7/00
(52) U.S. Cl. ........................ 60/247; 60/768; 60/39.39; 137/15.1
(58) Field of Search .................... 60/247, 767, 768, 60/39.39; 137/15.1

(56) References Cited

U.S. PATENT DOCUMENTS

| | | | | |
|---|---|---|---|---|
| 3,332,236 A | * | 7/1967 | Kunsagi | 60/39.39 |
| 4,570,438 A | * | 2/1986 | Lorenz | 60/39.39 |
| 5,317,973 A | | 6/1994 | Winaver et al. | |
| 5,513,489 A | * | 5/1996 | Bussing | 60/39.38 |
| 5,546,744 A | * | 8/1996 | Winfree et al. | 60/247 |
| 5,579,633 A | | 12/1996 | Hunter, Jr. et al. | |
| 5,615,548 A | | 4/1997 | Winfree et al. | |
| 5,901,550 A | | 5/1999 | Bussing et al. | |
| 5,937,635 A | * | 8/1999 | Winfree et al. | 60/39.38 |
| 6,449,939 B1 | * | 9/2002 | Snyder | 60/39.06 |
| 2002/0139106 A1 | * | 10/2002 | Meholic | 60/39.39 |

OTHER PUBLICATIONS

Pegg, R.J., Couch, B.D., Hunter, L.G., Pulse Detonation Engine Air Induction System Analysis, Jul. 1–3, 1996, pp. 1–16.
Hinkey, J.B., Williams, J.T., Henderson, S.E., Bussing, T.R., Rotary–Valved, Multiple–Cycle, Pulse Detonation Engine Experimental Demonstration, Jul. 6–9, 1997, pp. 1–18.
Bussing, T., Pappas, G., An Introduction to Pulse Detonation Engines, Jan. 10–13, 1994, pp. 1–14.

* cited by examiner

Primary Examiner—Charles G. Freay
Assistant Examiner—John F. Belena
(74) Attorney, Agent, or Firm—June E. Rickey; Calfee, Halter & Griswold LLP

(57) ABSTRACT

A rotary inlet flow controller, with one or more open ducts extending therethrough, aerodynamically controls the amount and velocity of the flow of air to combustion chambers of pulse detonation engines, or other engines, without imposing large cyclic airflow transients in the diffuser of the air intake. The ducted rotary inlet flow controller supplies airflow and sealing in synchronization with the cycles of the engine: airflow and fueling supply, sealing, combustion, and re-opening for additional airflow. This controller will supply near-uniform, continuous airflow to the engine. The preferred controller has one or more propeller-like blades that are designed to cyclically and sequentially duct incoming flow to the inlet ports of the combustion chambers, while also providing the capability of sealing the ports during combustion. The blades are aerodynamically designed to provide the desired converging airflow ducting area between the blades from the entrance to the exit to effect proper matching of the airflow from any air intake to a pulse detonation engine.

24 Claims, 18 Drawing Sheets

ROTARY INLET FLOW CONTROLLER FOR PULSE DETONATION COMBUSTION ENGINES

CROSS-REFERENCE TO RELATED APPLICATIONS

This application claims the benefit of U.S. provisional application serial No. 60/231,261 filed on Sep. 8, 2000.

FIELD OF THE INVENTION

This invention relates to flow controllers for combustion engines and more particularly, though not exclusively, to a ducted rotary inlet flow controller designed and adapted to aerodynamically control the airflow quantity and velocity at the inlet to a pulse detonation engine (PDE).

BACKGROUND

In the prior art, turbojet and turbofan engines have been directly attached to aircraft inlets without an interface being required. These engines require constant and near-uniform airflow supply, and include compressors and turbines that are complex and expensive. They are generally limited to flight speeds less than Mach 3 because of high temperatures. The current demand is for more fuel efficient, simpler, and lighter weight engine systems. Predicted performance for pulse detonation engines indicates that these engines offer increased efficiency over current systems, and that this increased efficiency is available over a wide range of flight speeds. The PDE offers several additional advantages over a conventional turbomachinery based engine system. These engines offer simplicity and light weight. The PDE is scalable over a range of sizes, and very small engines are possible. They also offer geometric flexibility that allows a wider range of more efficient propulsion/airframe integration schemes. However, the pulse detonation engine imposes different airflow demands on the high-speed inlet than a conventional turbojet engines. The PDE airflow demand is in a cyclic "on/off" manner. Combustion chambers of a pulse detonation engine are similar to the pistons of an automobile gasoline engine. Airflow and fuel are injected into the chamber to form a combustible mixture with a detonation initiated by a spark source. In the case of a pulse detonation engine, the explosion of the air and fuel mixture creates a high-pressure wave that moves down the combustion tube to the exit. The large increase in pressure in the chamber from the detonation of the combustible mixture results in propulsive thrust. The cycle for each combustion chamber of the pulse detonation engine is airflow fill (airflow entrance open) and fuel injection, airflow entrance closed, ignition, high combustion chamber pressure, and exhaust from the open end of the combustion chamber. At the beginning of the propulsive cycle, the combustion chamber is opened to the inlet airflow supply. Fuel is injected with the airflow to enhance mixing. The chamber is then sealed to the incoming airflow, thus eliminating the demand of airflow from the inlet. The combustible mixture is ignited and the high pressure created by the detonation provides a thrust force on the forward wall of the chamber. The chamber then is re-opened to draw additional airflow for the next combustion cycle. A high-speed valve must provide this opening and closing of the airflow supply port. A high-speed valve is required since high engine efficiency typically requires combustion frequencies of as much as (or more than) 100 Hertz. Multiple pulse detonation combustion chambers can be located at the diffuser exit of a high-speed inlet and fired alternately. However, if a conventional design for an airflow control valve, such as the valve disclosed in U.S. Pat. No. 5,901,550 to Bussing et al is used, less than 50% of the inlet diffuser exit area is available for airflow into the engine. Less than half of the diffuser exit area is available because some overlap is required for sealing of the chamber from the incoming air supply duct and to allow for proper combustion. Typically, multiples of two chambers would be used. If two large chambers are used (one open and one closed), then the engine would demand only a part of the available airflow at the exit. If four valves are used, then two would open as two were closed, providing the same demand if only two larger chambers are used. As the valve moves to close one chamber and open the next chamber, the airflow demand decreases and then increases as the next chamber is filled. This cyclic demand for airflow places severe requirements on the inlet.

SUMMARY OF THE INVENTION

The innovative design disclosed herein provides a rotary inlet flow controller, with one or more open ducts extending through the controller. The ducts are designed and adapted to aerodynamically control the amount and velocity of the flow of air to combustion chambers of a pulse detonation engine without imposing large cyclic airflow transients in the diffuser of the air intake. The ducted rotary inlet flow controller is designed to supply airflow and sealing in synchronization with the cycles of the engine: airflow and fueling supply, sealing, combustion, and re-opening for additional airflow. This controller will supply near-uniform, continuous airflow to the engine. For example, if the pulse detonation engine consists of four combustion chambers, the preferred controller design will duct the inlet diffuser exit airflow to two of the chambers while sealing the other two for the combustion part of the engine operating cycle.

The preferred controller has one or more propeller-like blades that are designed to cyclically and sequentially duct incoming flow to the inlet ports of the combustion chambers, while also providing the capability of sealing the ports during combustion. The blades are aerodynamically designed to provide the desired converging airflow ducting area between the blades from the entrance to the exit to effect proper matching of the airflow from any air intake to a pulse detonation engine. Leading and trailing edges of the blades may be straight or contoured to obtain a desired effective ducting of the airflow. The leading edges are preferably sharp or rounded with a small radius so that the blades effectively present one or more knife edges to the incoming air and the incoming air can flow smoothly, with minimal disruption, past the entire inlet face of the controller. The trailing edges of the blades may also have sharp or curved edges. However, the trailing side of each blade has two edges, separated by a flat surface that seals each port to a combustion chamber as the trailing edge of the blade passes over the port. When the trailing edge of a first blade is aligned with the port to a first combustion chamber, the port will be closed and combustion is initiated within the combustion chamber.

For most applications, the controller will have one blade and one duct for every two combustion chambers in the engine it supplies. As illustrated and described below, for example, with a pulse detonation engine having four combustion chambers (with an inlet port for each chamber) and a flow controller having two blades and two ducts, when the outlet from a first duct is aligned with a first port, the outlet from the second duct will be aligned with port number three, and air or other oxidizing gas can flow into combustion chambers one and three. At the same time, the trailing sealing surfaces of the two blades cover ports two and four, and combustion can be initiated in these chambers. As the controller continues to rotate, e.g. through a 45° arc, the outlet from each duct will become partially aligned with two ports, and gas can flow into all four combustion chambers. Further rotation once again brings the outlet from each duct into alignment with one port, leaving the remaining two chamber inlets sealed for combustion. However, as discussed in more detail below, application of this controller is not limited to engines with an even number of combustion chambers. The rotary flow controllers of this invention may have any number of blades and may be used with any number of combustion chambers, even or odd.

This arrangement does not create the flow discontinuities that plagued prior art inlet valves for pulse detonation engines. Airflow through the flow controller is substantially uniform and continuous. The system does not generate large cyclic airflow transients in the air inlet diffuser. As a result, the utilization of the flow controller offers increased efficiency. In the prior art, less than one-half of the available flow area in the entrance duct could be used for airflow ducting at any selected time, allowing only a portion of the available airflow to be processed by the engine. The rotary flow controller allows all of the flow to be processed, thus providing a substantial increase in efficiency. Therefore, a pulse detonation engine in combination with a rotary airflow controller can operate at a much higher combustion frequency because more airflow is available for combustion. The optimum airflow processing by the engine system is important when these engine systems are considered for aircraft propulsion since frontal area imposes a drag penalty. The rotary controller offers the capability of more thrust for a given frontal area of the air intake, or offers the same thrust for an engine with significantly less frontal area, drag, and obviously weight.

The rotary inlet flow controllers of this invention may process flow through all of a circular duct. They may also control airflow through an annular part of a circular duct. This type of controller is particularly suited for a combined engine system, such as a turbojet or turbofan located in the center of a circular duct with a pulse detonation engine located around the periphery to function as an afterburner. Turbojet and pulse detonation engine arrangement of this type can provide the propulsion necessary for flight speeds up to Mach 5. For this engine system, the turbojet/turbofan engine provides thrust for lower-speed conditions up to about Mach 2 to 3, and the pulse detonation engine provides thrust for the higher Mach numbers after the low-speed propulsion engine has been shut down and isolated from temperature effects at high Mach flight conditions. This invention may also be applied to a combined cycle hypersonic propulsion system, with the rotary flow controller and pulse detonation engine located in the center of a circular duct with a combined ramjet and/or scramjet airflow duct positioned in a wrap-around arrangement.

These ducted rotary inlet flow controllers can be used with pulse detonation engines for supersonic, subsonic or hypersonic military or commercial aircraft; with pulse detonation engines for subsonic, supersonic or hypersonic missiles; and with pulse detonation engines for launch vehicles for space access. They can also be used for combustion engines for many other propulsive applications, including rotorcraft, watercraft, or land vehicles. While the preferred use is for flight vehicle propulsion, the rotary airflow controller and pulse detonation engine can be applied as a ground based engine system to produce mechanical work.

Other features and advantages of this invention will be apparent to those skilled in the art after reading the following detailed description and the accompanying drawings.

DRAWINGS

FIGS. 13 through 16 present a simplified representation of the functioning of the rotary flow controller to control airflow.

Figure 17:
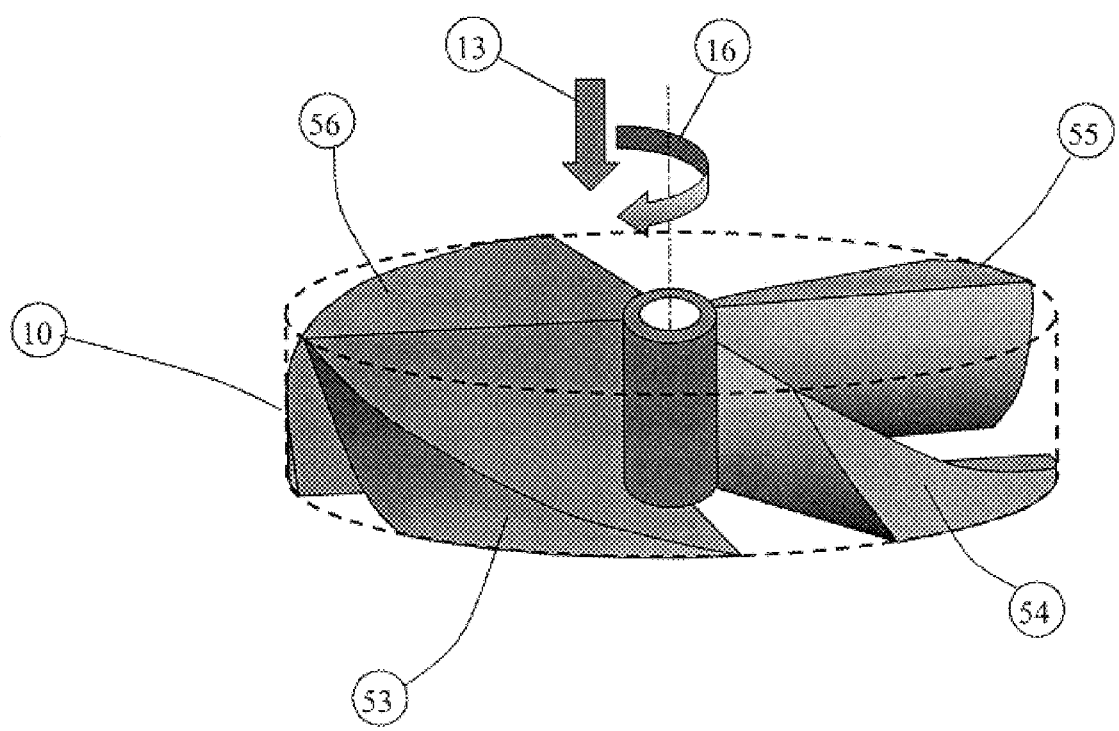
Figure 18:
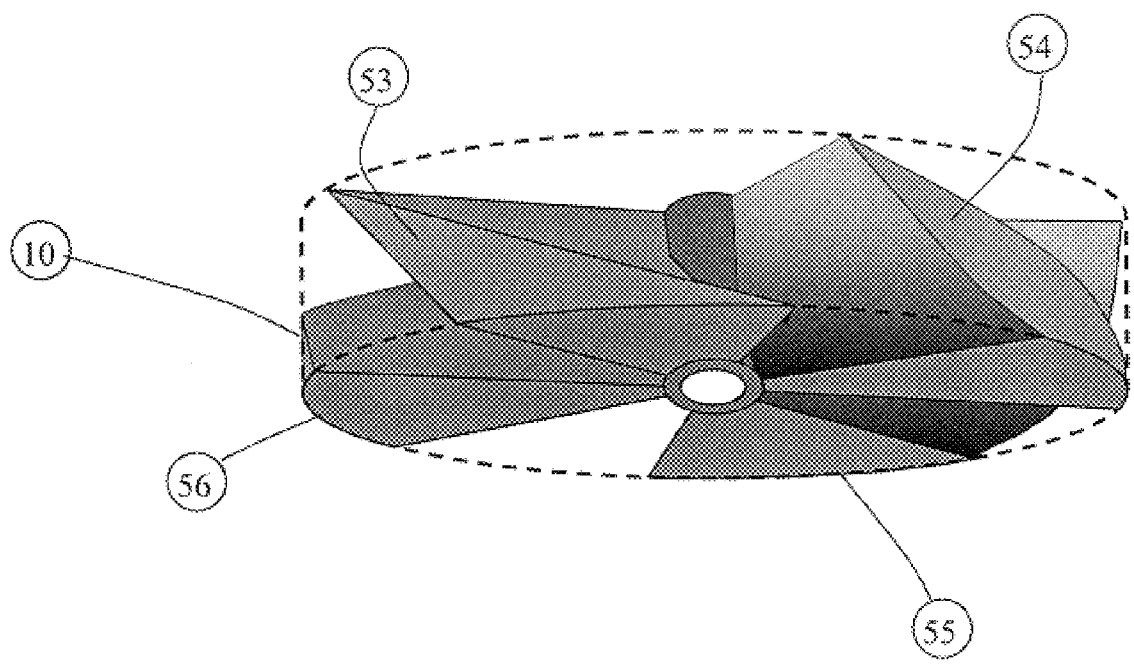

FIGS. 17 and 18 show isometric views of a rotary inlet flow controller consisting of four blades.

Figure 19:
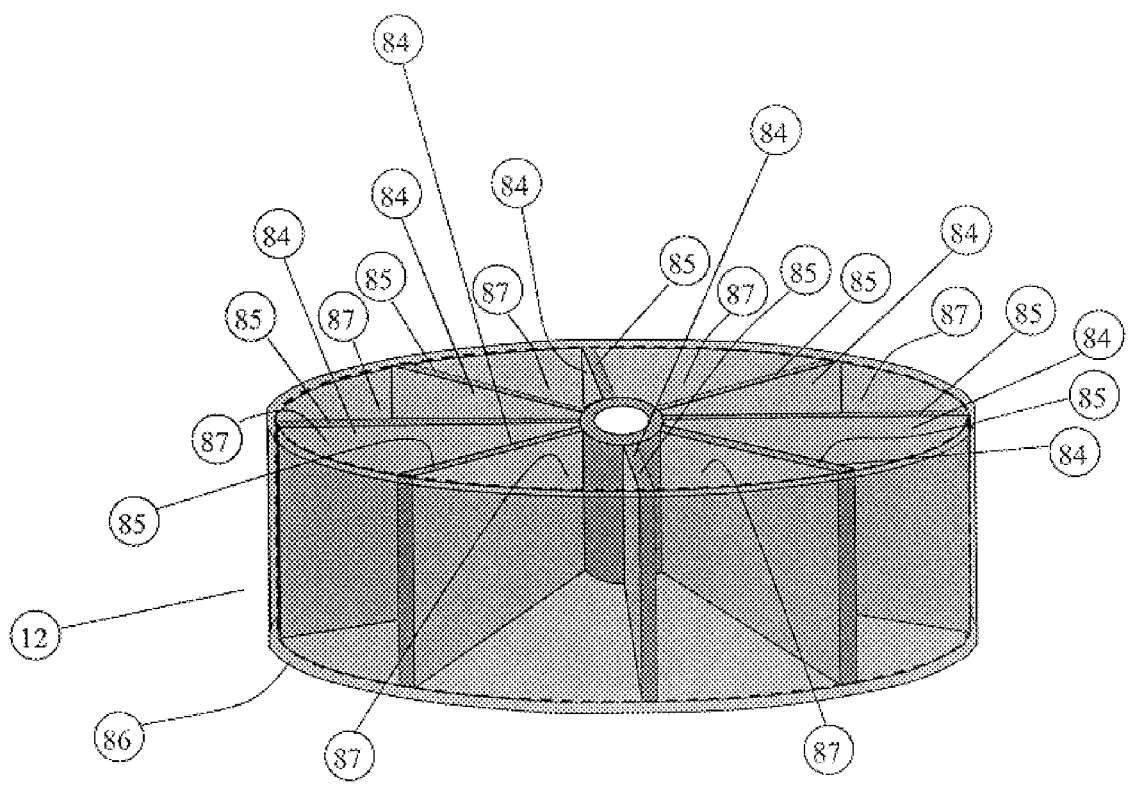

FIG. 19 illustrates an eight-chambered pulse detonation engine frame to which airflow is provided by the four-blade rotary inlet flow controller.

Figure 20:
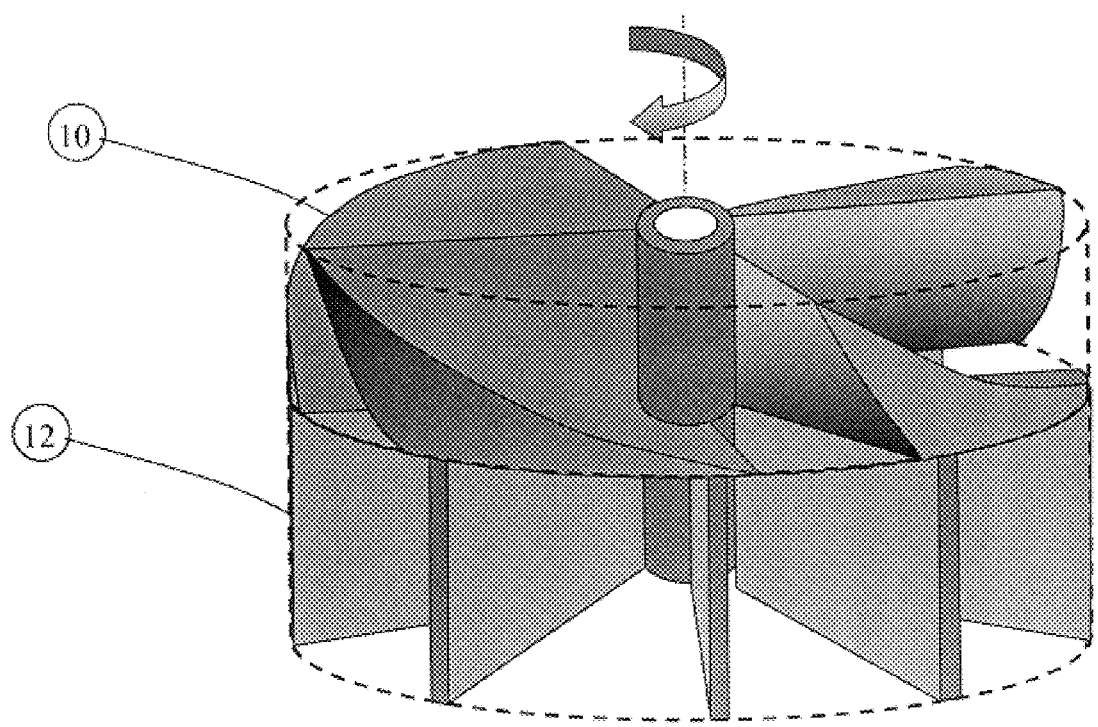

FIG. 20 shows an isometric view of the four-bladed rotary inlet flow controller installed with the eight-chambered pulse detonation engine frame.

Figure 21:
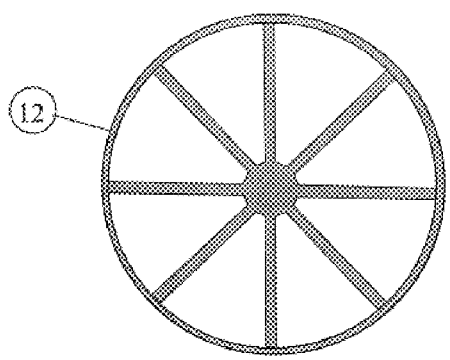

FIG. 21 shows a top view of the eight-chambered pulse detonation engine frame.

Figure 22:
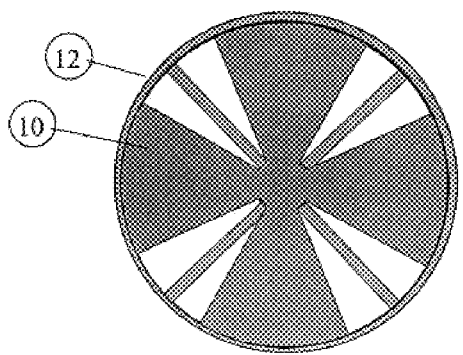

FIG. 22 shows a top view of the interface between the eight-chambered pulse detonation engine frame with the exit surfaces of the four-bladed rotary inlet flow controller.

Figure 23:
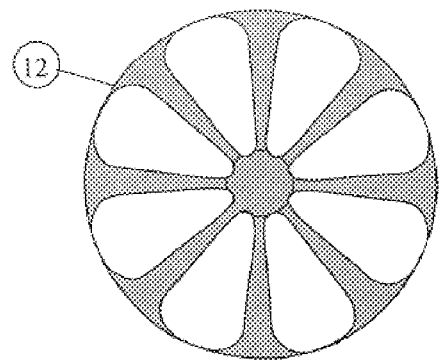

FIG. 23 shows a top view of an eight-chambered pulse detonation engine frame with a modified frame geometry to provide chambers with filleted corners.

Figure 24:
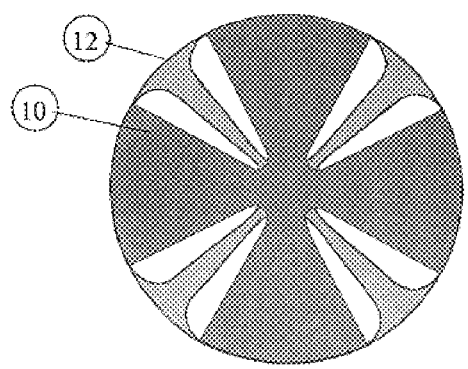

FIG. 24 shows a top view of the interface between the modified eight-chambered pulse detonation engine frame with filleted chamber corners with the exit surfaces of the four-bladed rotary inlet flow controller.

Figure 25:
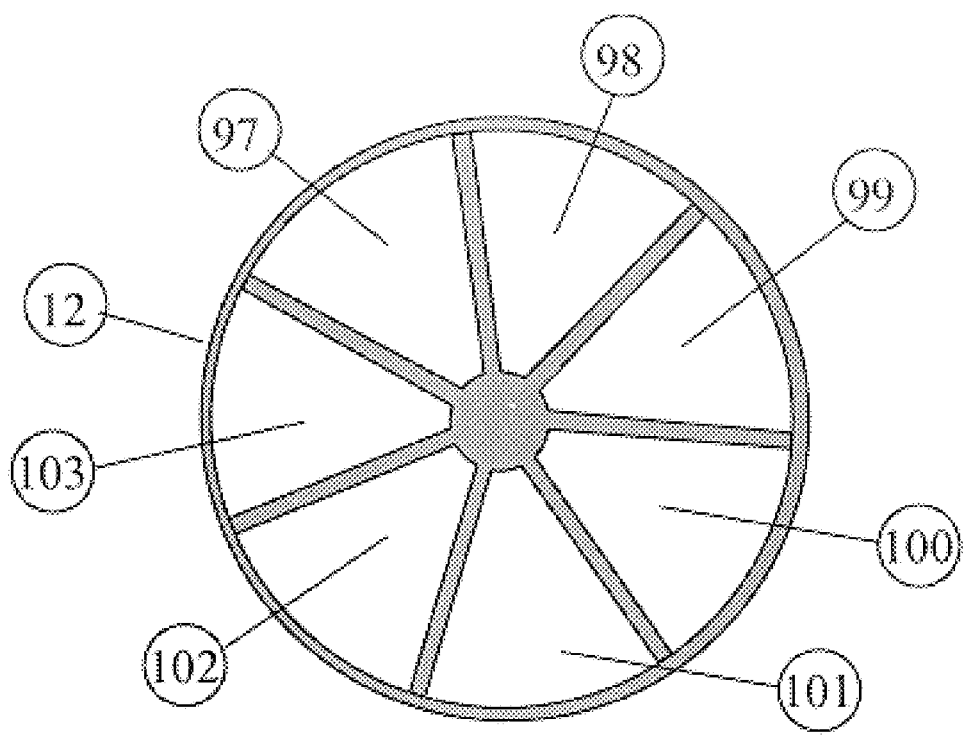

FIG. 25 shows a top view of a seven-chambered pulse detonation engine frame.

Figure 26:
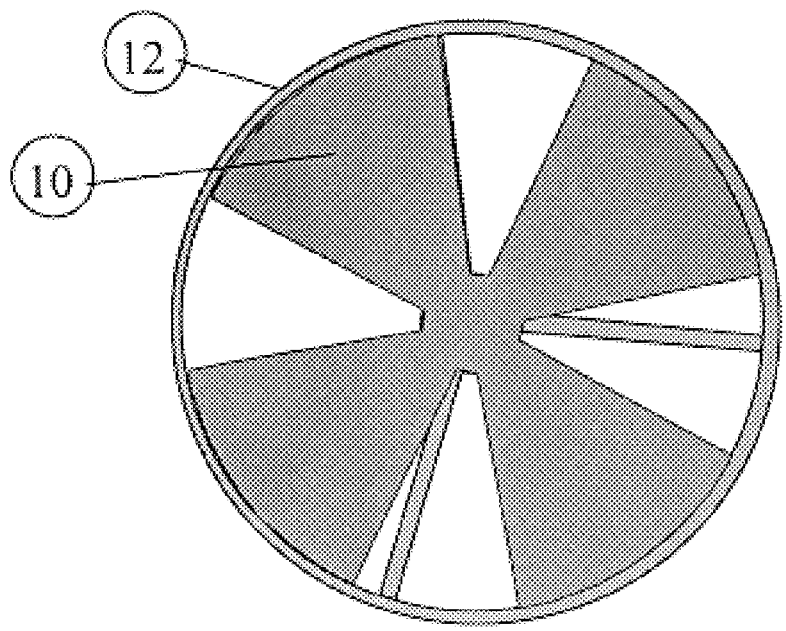

FIG. 26 shows a top view of the interface between the seven-chambered pulse detonation engine frame with the exit surfaces of the four-bladed rotary inlet flow controller.

Figure 27:
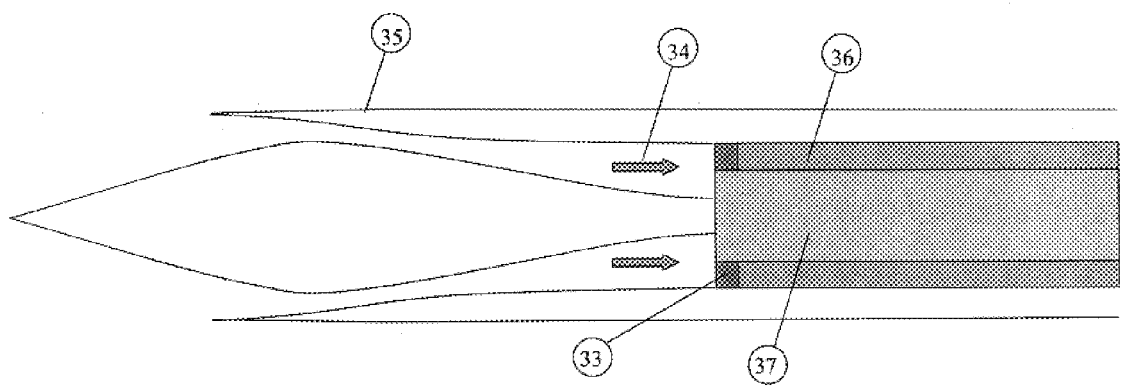

FIG. 27 is a cross-sectional view of an annular variation of the rotary flow controller, integrated with a combined system with pulse detonation chambers located around the periphery of a turbojet engine.

Figure 28:
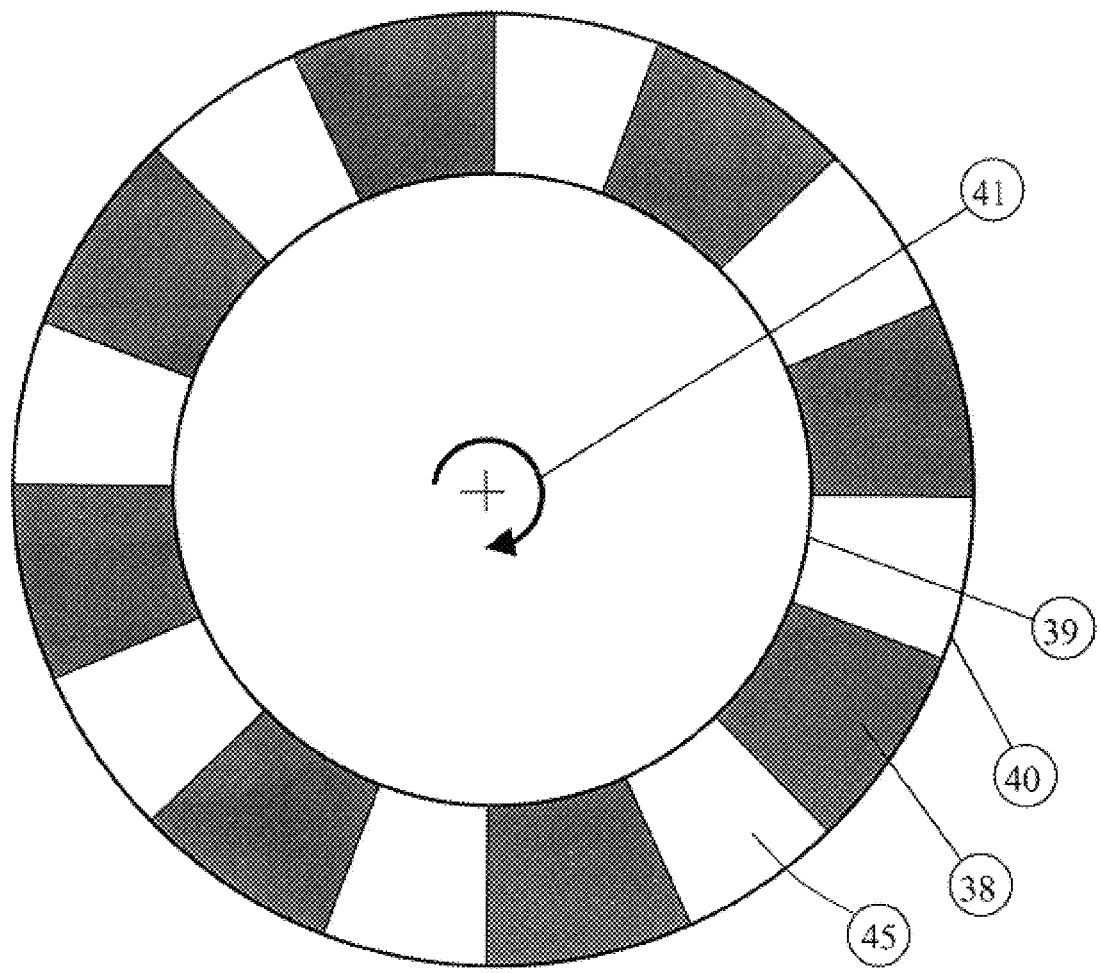

FIG. 28 is an end view of the annular rotary flow controller shown in FIG. 27.

Figure 29:
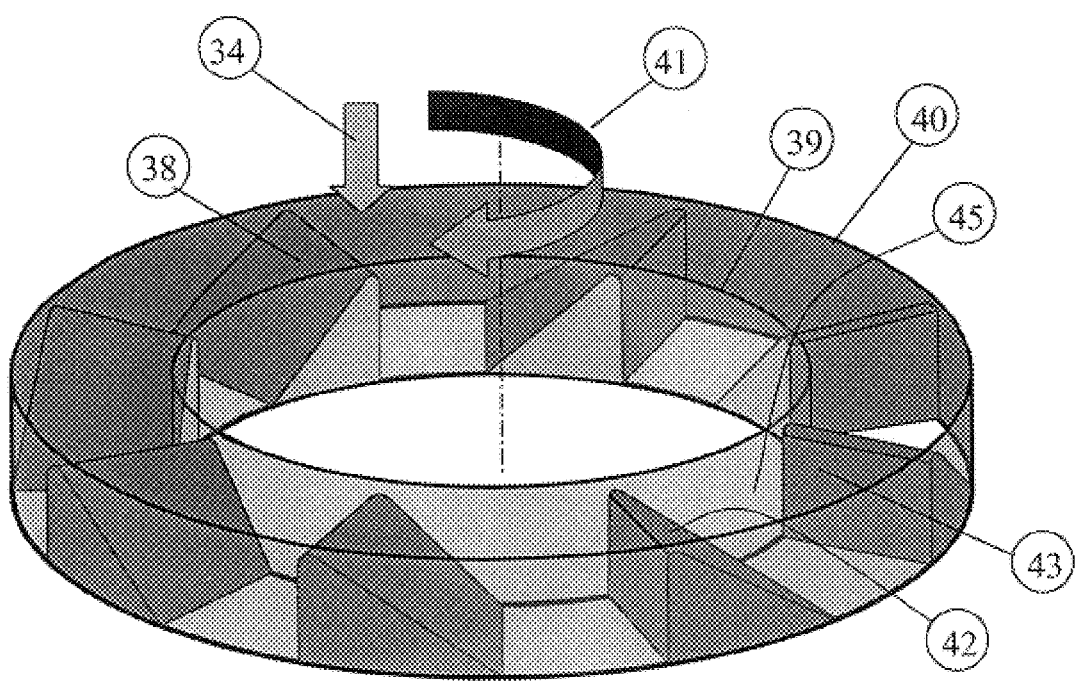
Figure 31:
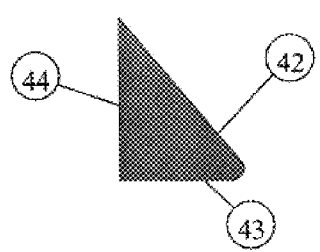
Figure 30:
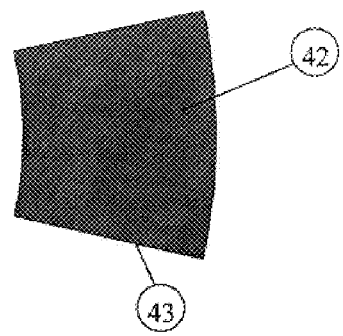
Figure 32:
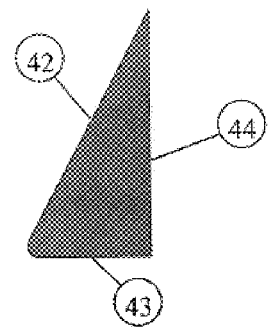

FIG. 29 is an isometric view of the annular flow controller shown in FIGS. 27 and 28.

FIGS. 30 through 34 show views of the five surfaces of one blade of the annular flow controller shown in FIGS. 27, 28 and 29.

DETAILED DESCRIPTION

Figure 1:
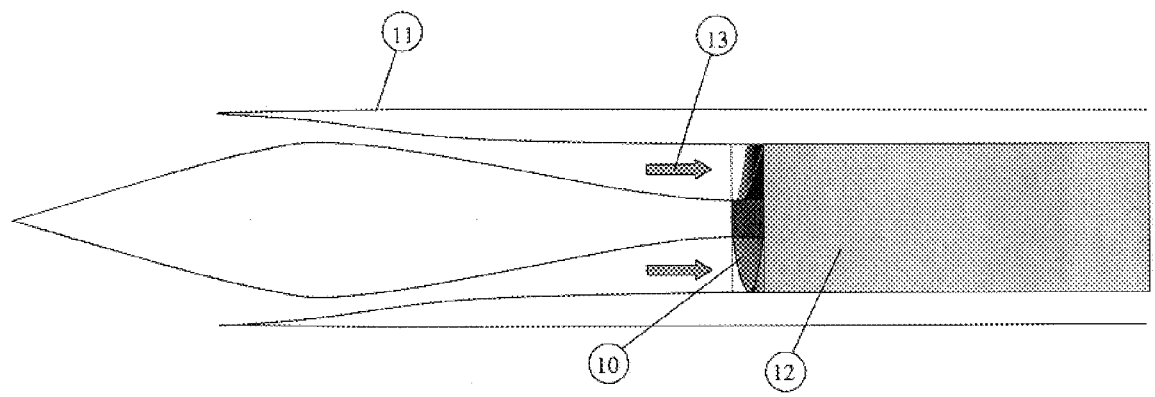
FIG. 1 shows a rotary inlet flow controller of this invention integrated with a high-speed inlet and a pulse detonation engine.

FIG. 1 is a cross-sectional view of a propulsion system with a ducted rotary flow controller 10 installed between a high-speed inlet 11 and a pulse detonation engine 12. For this configuration, the airflow 13 in the round cylindrical duct at the exit of the high-speed inlet enters the ducted rotary flow controller and exits into the engine.

Figure 2:
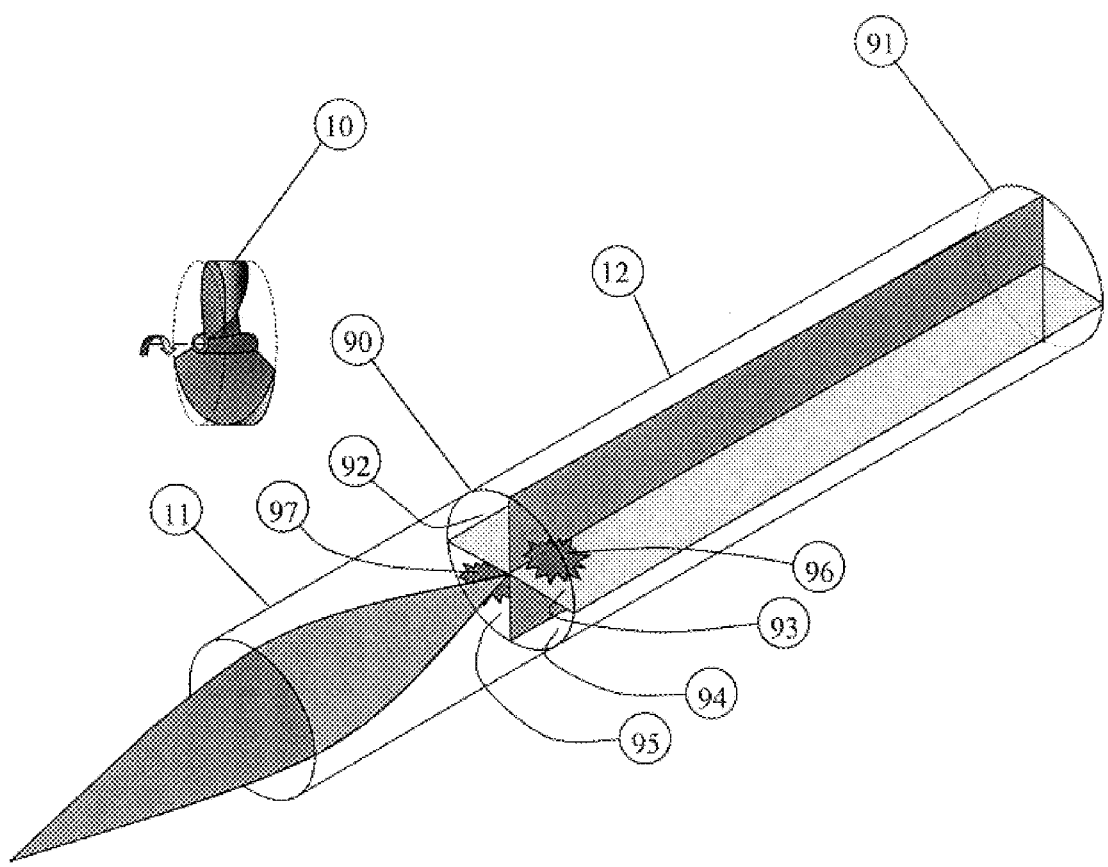
FIG. 2 shows a simplified, partially exploded isometric view of an air inlet installed in front of a four-chambered pulse detonation engine.

FIG. 2 shows a partially exploded view of a high-speed inlet 11 installed with a pulse detonation engine 12 with four combustion chambers 92 through 95. The chambers are open tubes that extend from the interface station 90 to the exit 91. The engine operates such that combustion (indicated by the flashes 96 and 97) will occur in half of the chambers (in this case, 93 and 95) simultaneously. For ease of understanding, the rotary airflow controller 10 that would be installed at the interface station 90 between the inlet 11 and the engine 12 is shown at the side of the engine system. The rotary airflow controller seals chambers 93 and 95 while firing occurs in them, and allows airflow to fill chambers 92 and 94. Rotation of the airflow controller 10 then opens chambers 93 and 95 for airflow, while sealing 92 and 94 for combustion.

Views of a rotary flow controller are shown in FIGS. 3 through 6. The rotary flow controller 10 illustrated in these figures represents a configuration that is designed to control the airflow into four combustion chambers of a pulse detonation engine. The flow into the combustion chambers will normally consist of air. It should be understood, however, that the term "airflow," as used herein, is intended to encompass air, gases and gaseous mixtures such as vaporized fuel.

The rotary flow controller 10 of FIGS. 3 through 6 is similar to a two-bladed propeller. The angular extent of the blades is selected during the aerodynamic design process, with several factors impacting the design of the rotary inlet controller blades and ducts. These factors include geometry requirements such as overlap for sealing, exit area of the inlet, rotary inlet controller duct entrance to exit area ratio, number of combustion chambers, engine entrance shape, rotary controller height and diameter, radial position, radius of hub, rate of combustion, rotor speed, etc. Aerodynamic factors that influence the design include inlet diffuser exit airflow velocity, allowable engine entrance velocity, engine chamber pressure during airflow injection, engine airflow demand, inlet design, inlet subsonic diffuser design, etc. The rotary flow controller duct surfaces are designed to provide ducting of the incoming airflow from air inlet 11 to pulse detonation engine 12 (FIG. 1). If desired, the surfaces can be designed or shaped to prevent spanwise migration of the airflow along the blade, for example by adding fences, scalloping or the like along the top edge 17.

Figure 4:
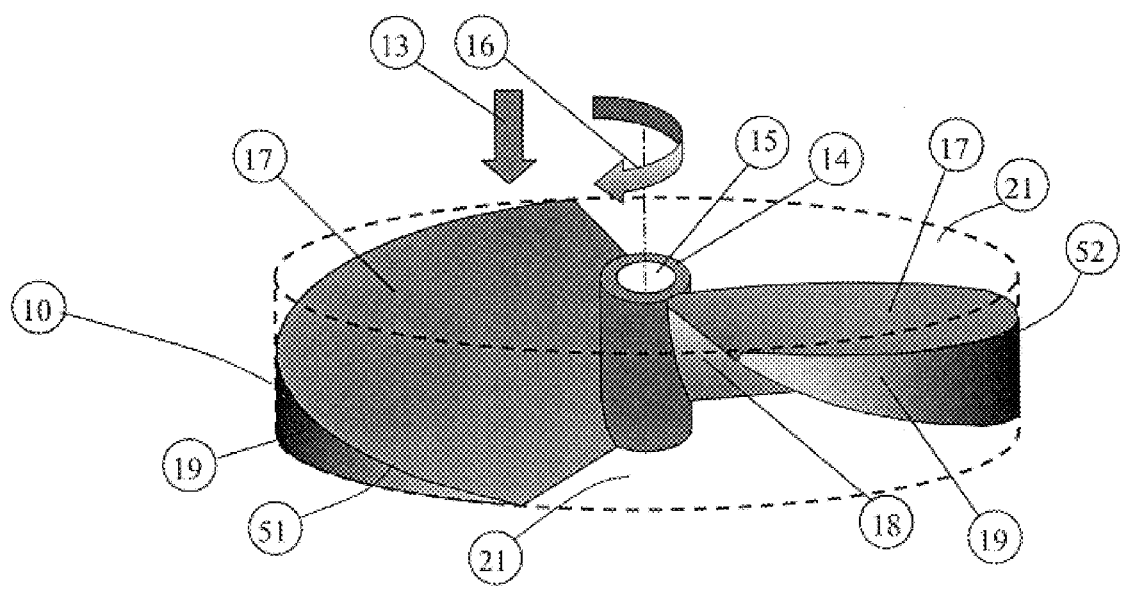
Figure 6:
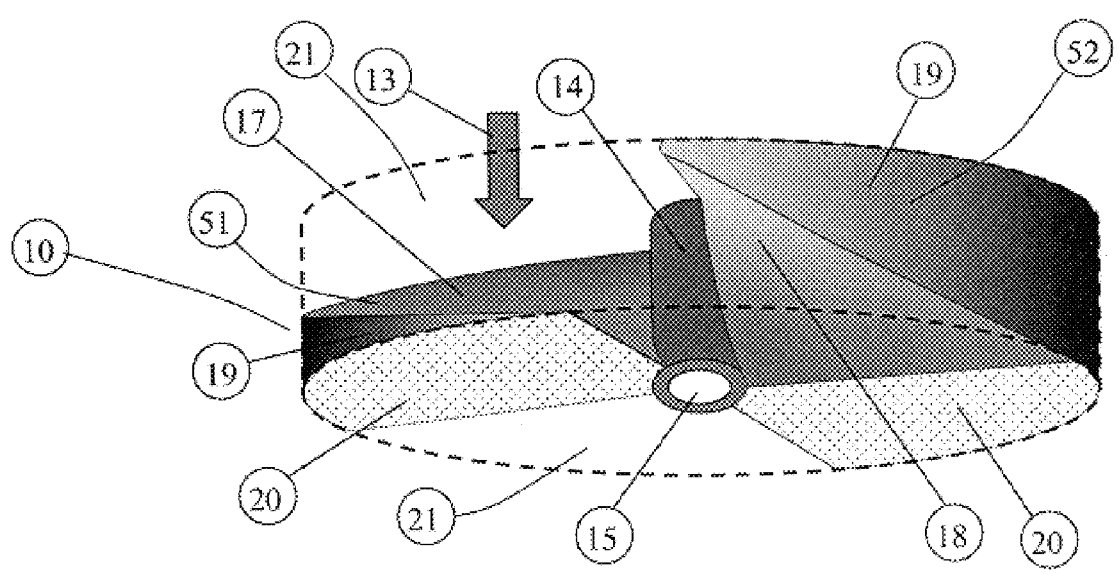

The approach airflow 13 to the rotary flow controller is indicated in FIGS. 1, 4, and 6.

Each blade is attached to a center shaft 14 with a hole 15 for mounting the rotary flow controller on a drive shaft. The rotary airflow controller rotates in the direction indicated by the arrow 16.

The blades are composed of an upstream surface 17 and a downstream surface 18 with an outer or tip surface 19 and a sealing surface 20 (shown in FIGS. 5 and 6) at the exit plane. As best seen in FIG. 4, the upstream surface 17 of a first blade 51 and the downstream surface 18 of a second blade 52 define a first converging aerodynamic duct 21. The upstream surface 17 of the second blade 52 (shown in FIG. 4) and the downstream surface 18 of the first blade 51 (shown in FIG. 5) define a second converging aerodynamic duct 21.

Figure 5:
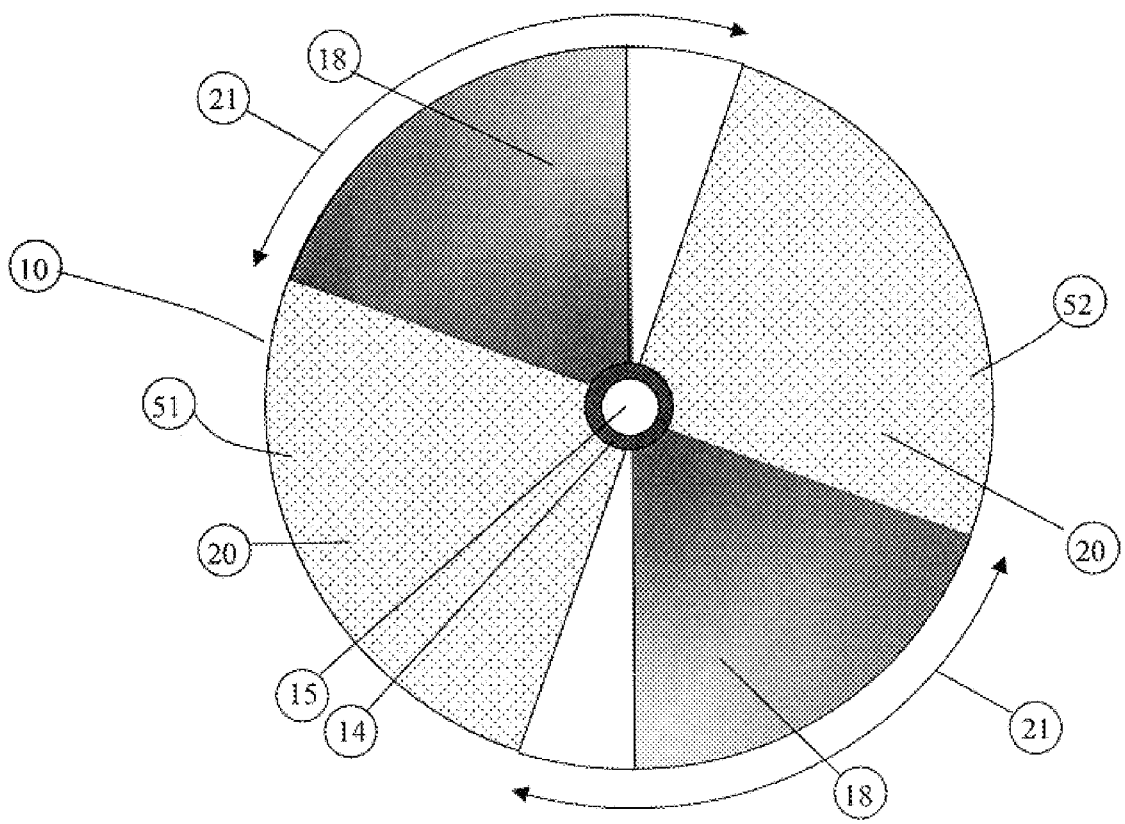

The bottom view sketches of FIGS. 5 and 6 show the sealing surfaces 20 of the two-bladed rotary flow controller that provide a means of alternately shutting off the airflow supply to two of the combustion chambers of the four-chamber engine, while the ducts or open sectors 21 allow airflow to be supplied to the other two chambers for the configuration depicted in these figures. The sealing surfaces 20 are larger in circumferential extent than the exits from ducts 21, i.e. the open areas at the rotary flow controller exit. The general requirement is that the area of the sealing surface is larger than the entrance to the detonation chambers. This difference is required for overlap of the rotary flow controller surface on the flange at the entrance opening to the combustion chamber to effect a sealing of the entrance to the combustion chamber prior to ignition. The rotational speed of the rotary flow controller is dictated by the desired combustion rate. For instance, the rotary flow controller of FIGS. 1 through 6 would rotate about the center axis at 3000 rpm to provide a combustion rate of 100 firings per second for the four-chamber engine in which two opposite chambers fire at the same time.

Figure 7:
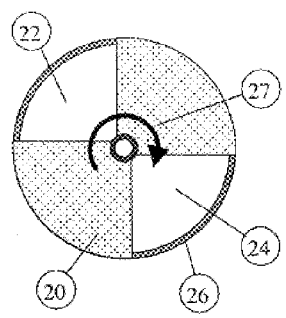
FIGS. 7 through 12 illustrate the functioning of the two-bladed ducted rotary flow controller as an airflow control for the airbreathing pulse detonation propulsion system for a flight vehicle.
Figure 8:
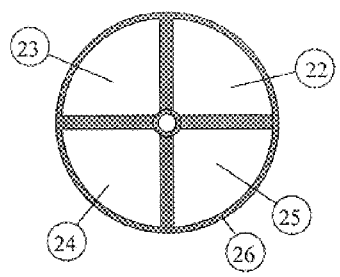
Figure 9:
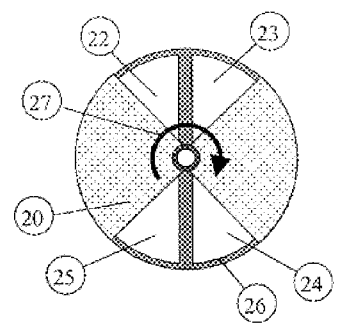
Figure 10:
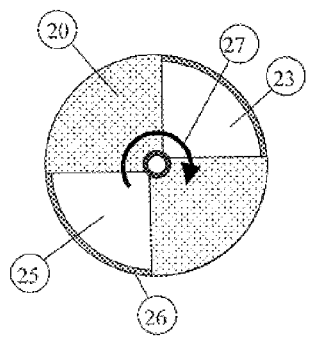
Figure 11:
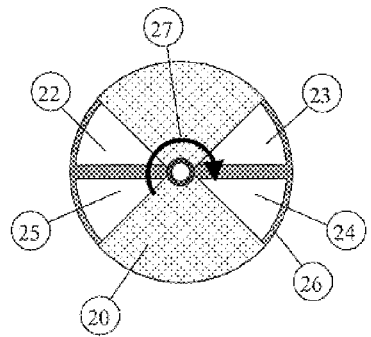
Figure 12:
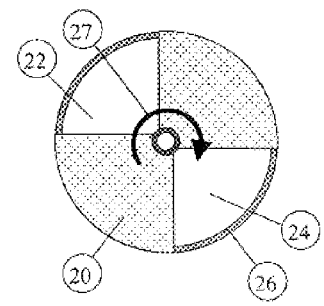

FIGS. 7 through 12 show the functioning of the rotary flow controller to control the airflow into engine chambers 22, 23, 24, and 25. In these figures, as for the engine shown in FIG. 2, a cross-section of a combustion chamber is a quadrant of a circle. In FIG. 7, a downstream view of the cross-section of the rotary flow controller at the exit plane (as shown in the bottom isometric view in FIG. 6) is shown superimposed on the engine entrance frame 26 separating the combustion chambers of the engine. The rotary flow controller rotates about the center axis in the direction indicated by the arrow 27, and alternately closes and opens the airflow passages into the combustion chambers. A downstream view of the engine frame 26 separating the combustion chambers 22, 23, 24, and 25 is depicted in FIG. 8. Five rotation positions for the rotary flow controller, for a total rotation of 180°, are shown in the figures. FIG. 7, for a rotary flow controller rotation of 0°, shows that airflow can enter the chambers 22 and 24, while the entrances to propulsion system chambers 23 and 25 are closed (sealed) and ready for ignition from a spark source. FIG. 9 shows that the rotary flow controller has rotated 45°. At this point in the rotation of the rotary flow controller, chambers 22 and 24 are still filling with airflow, although the fill rate is decreasing as the rotary flow controller continues to rotate. The airflow passages to chambers 23 and 25 have begun to open and allow airflow to enter. FIG. 10 shows the rotary flow controller at a rotation of 90°. At this position, chambers 22 and 24 are now closed and ready for combustion while chambers 23 and 25 are continuing to fill with airflow. Rotation of 135° is presented in FIG. 11. Chambers 22 and 24 are: opening, and the rate of airflow into chambers 23 and 25 has begun to decrease. FIG. 12 shows a rotary flow controller rotation of 180°. For this case, chambers 22 and 24 are open and chambers 23 and 25 are closed and ready for ignition. Chambers 23 and 25 were in a combustion status when the rotary flow controller was at the 0° position and are again ready for combustion for a rotation of 180°. Therefore, if a firing rate of 100 Hertz is desired for each combustion chamber, a rotary flow controller rotational speed of 50 rotations/second would be required because each chamber fires twice per revolution.

Figure 3:
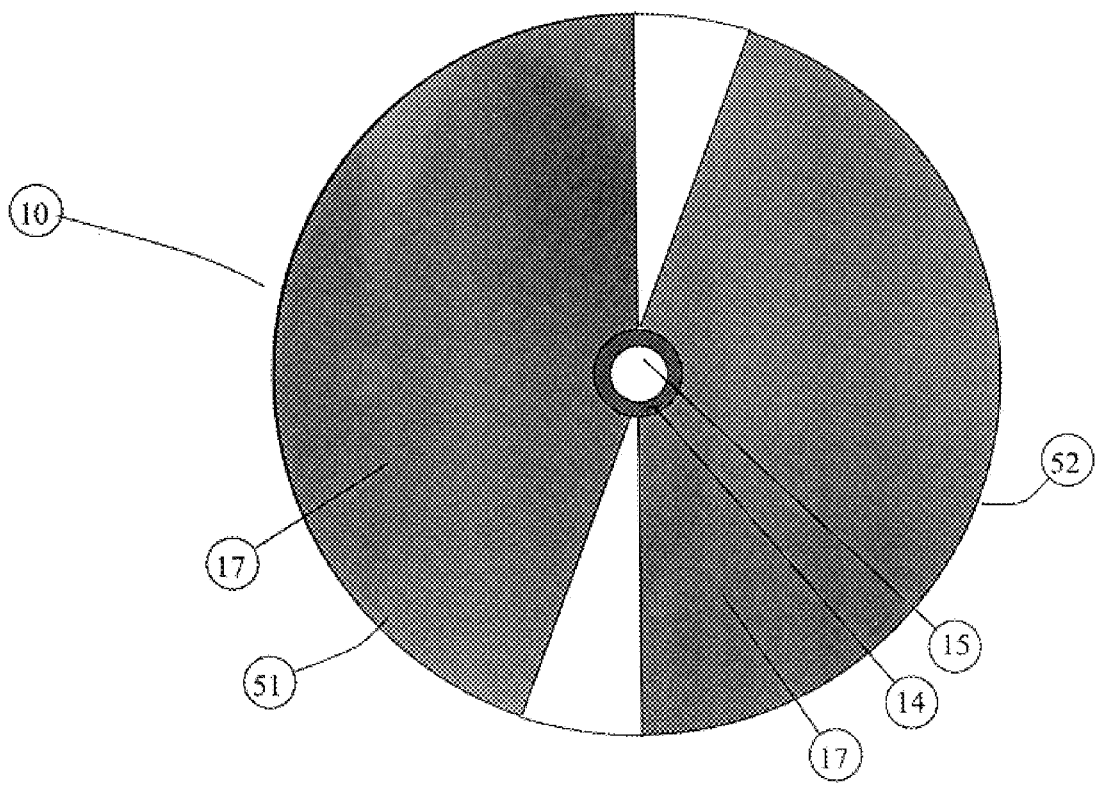
FIGS. 3 through 6 show top, isometric, and bottom views of a rotary inlet flow controller consisting of two blades.
Figure 13:
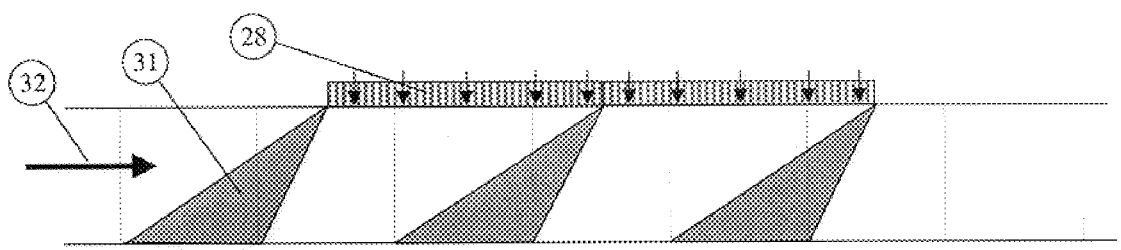
Figure 14:
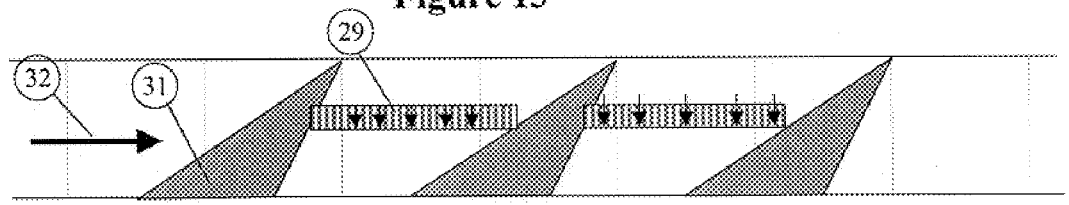
Figure 15:
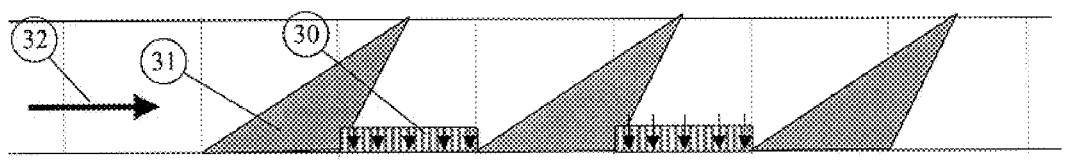
Figure 16:
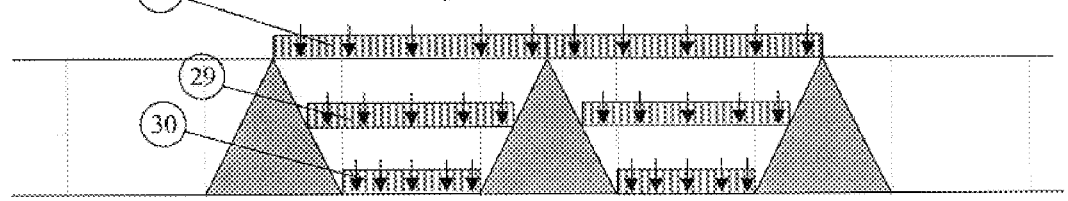

A simplified representation of the functioning of the rotary flow controller in controlling the airflow is presented in FIGS. 13 through 16. FIGS. 13 through 15 show the functioning of the rotary flow controller at selected points in time from a point in time at which the airflow is entering the blades to the time at which the airflow exits the blades. In these figures, the airflow control functioning of a circumferential cut (constant radial distance from the center) of the rotary flow controller 10 of FIG. 3 is presented. This circumferential plane is presented in the figures as a two-dimensional plane. FIG. 13 shows the airflow 28 entering the blades 31, FIG. 14 shows the airflow 29 halfway through the blades 31, and FIG. 15 shows the airflow 30 exiting the blades. FIG. 13 shows the rotary flow controller blades 31 at the initial condition, in which the airflow is entering the flow controller. Since the ducting area from the entrance to the exit of the rotary flow controller converges by a factor of two, the velocity of the entering airflow 28 will accelerate and nearly double at the exit of the rotary flow controller (airflow 30). Therefore, the average velocity of the airflow through the valve is about 1.5 times the freestream incoming velocity. Setting the rotational velocity 32 of the valve at the selected radial position at 1.5 times the incoming velocity results in the rotary flow controller blade design shown in FIGS. 13 through 15. The height of the blades 31 is adjusted for the distance that the airflow would travel in 1/50 of a second. This is a function of the average of the incoming and exiting airflow velocities. The distance traveled by the valve at the selected radial distance is also the same as the height since the circumferential velocity at this radial location is equal to the axial velocity. FIG. 14 shows the condition in which the airflow 29 is one-half the way through the rotary flow controller and the controller blades 31 have moved a distance equal to one-half the height. The airflow 30 has moved to the exit plane of the rotary flow controller and the blades 31 of the rotary flow controller have moved a total distance equal to the valve height in FIG. 15. A combination of the sequence of events that is shown in FIGS. 13 through 15 is presented in FIG. 16. This figure illustrates the effective ducting of the airflow. As indicated by the grid lines of the figure, an incoming airflow with a duct area of two grid spacings was reduced to an exit area grid spacing of one. This sketch also indicates that the airflow effectively moved straight through the controller. Since the maximum available entrance area to the engine is not more than one-half of the area of the airflow supply duct ahead of the rotary flow controller, the rotary flow controller must effectively and efficiently pass all of the supplied airflow into the engine. The rotary flow controller 10 of FIG. 3 achieves this goal. The goal is achieved through proper controller aerodynamic design and rotation speed to effectively accelerate the airflow so that all of the airflow from the inlet is continually processed by the engine, and thus any cyclic demand of airflow on the inlet is nearly eliminated.

The design of the rotary inlet flow controller is not limited to configurations with two blades supplying airflow to four pulse detonation combustion chambers. The concept may be applied to applications to engines with any number of combustion chambers, even or odd, and with the rotary flow controller consisting of any number of blades. Varying the number of blades relative to the number of chambers allows the designer to vary chamber firing rate and sequence. Combustion chamber geometry is not limited to sectors of an annulus with sharp corners. The rotary inlet flow controller of this invention may supply airflow to combustion chambers of any geometry, provided they are oriented in an annular fashion around the hub on which the controller rotates. Examples of three alternate designs are presented in FIGS. 17 through 26.

FIGS. 17 and 18 depict isometric views of a rotary inlet flow controller 10 consisting of four blades, 53 through 56. The design of this controller is analogous in every respect to the two-bladed controller of FIGS. 3 through 6, with the exception that the four blades, 53 through 56, duct airflow at the exit to an eight-chambered engine, instead of a four-chambered one.

FIG. 19 shows a typical embodiment of such an eight-chambered pulse detonation engine frame. The engine frame 12 consists of eight chambers 87, which are annular sectors of equal cross-sectional area, divided by webs 85 and enclosed on the outside by a cylindrical housing 86. The upper surfaces of the webs 85 comprise the engine face 84, with which the trailing edge of the rotary inlet flow controller effects a seal as it rotates to seal a combustion chamber. FIG. 20 shows the rotary inlet flow controller 10 installed together with the pulse detonation engine frame 12. The arrow 16 indicates the direction of rotation of the controller.

FIG. 21 shows a top view of an eight-chamber engine entrance frame 12. In FIG. 22, a downstream view of the cross-section of the rotary flow controller 10 at the exit plane (as shown in the bottom isometric view in FIG. 18) is shown superimposed on the engine entrance frame 12 separating the combustion chambers of the engine. In the figure, the rotary flow controller is rotated at a position in between chamber firings, in which flow is being supplied to all eight combustion chambers.

It is may be desirable that the combustion chambers not have sharp corners, like those shown for the engine frame shown in FIG. 21. Structurally, the chambers, which must contain the extremely high pressure of combustion, would be stronger if they had rounded corners. An example of an alternate engine frame design that incorporates rounded corners is illustrated in FIG. 23. In this design, the webs are wider near the outer edge of the annulus than near the hub, and the corners of the combustion chambers are filleted to provide additional structural strength. In FIG. 24, a downstream view of the cross-section of the rotary flow controller 10 at the exit plane (as shown in the bottom isometric view in FIG. 18) is shown superimposed on this alternate engine entrance frame 12 separating the combustion chambers of the engine.

An odd number of combustion chambers may be used. Such a design would sequence the firing of chambers more continuously. In such a design, half of the chambers would not fire simultaneously, as in the even-numbered chambered designs presented in previous figures. The chambers would, instead, fire one or more at a time in a sequence determined by the number of chambers, the number of rotary controller blades, and the blade design.

FIG. 25 shows the face of an engine frame 12 consisting of seven combustion chambers 97, 98, 99, 100, 101, 102 and 103. In FIG. 26, a downstream view of the cross-section of a four-bladed rotary flow controller 10 at the exit plane (as shown in the bottom isometric view in FIG. 18) is shown superimposed on this seven-chambered engine entrance frame 12. From this figure, it is evident that only one chamber will be fully closed at a given rotation position. Therefore, chambers will fire one at a time, in a sequence that will be more continuous in nature than for designs with even-numbered chambers. Unlike those designs, however, the firing of a chamber on one side of the engine will not be balanced by the firing of another chamber directly opposite it. For the controller and engine shown in FIGS. 25 and 26, the firing order would be 97, 99, 101, 103, 98, 100, 102, 97.

Figure 33:
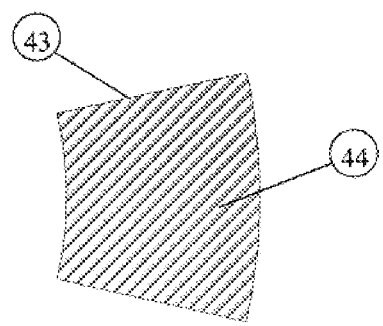
Figure 34:
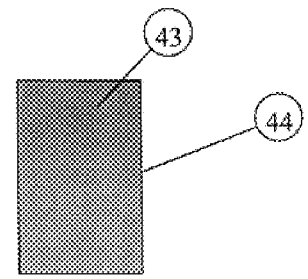

An annular flow control is another embodiment of the rotary flow controller device. This type of arrangement is presented in FIG. 27. In this arrangement, an annular rotary flow controller 33 controls the airflow 34 from an inlet 35 to pulse detonation combustion chambers 36 that are located around the periphery of a turbojet engine 37. In this arrangement, the pulse detonation system functions as an afterburner for the propulsion system. Details of this variation of the rotary flow controller are presented in FIGS. 28 through 34. This variation of the controller incorporates several airflow control blades 38 inside an inner circular cylinder 39 and an outer circular cylinder 40 as shown in FIGS. 28 and 29. The incoming airflow is indicated by arrow 34, and the direction of controller rotation is denoted by arrow 41. The sealing surface 44 is shown in FIG. 33. As shown in FIGS. 20 to 34, the blades 38 include aerodynamic surfaces 42 and 43, which define an airflow duct 45 from the entrance to the exit of the rotary controller. The design of these surfaces is different from that of the surfaces of the product of FIGS. 3 through 6. Several factors influence the design of these aerodynamic surfaces. The rotary flow controller of FIGS. 28 and 29 has eight blades 38. To open and close an entrance to a combustion chamber only requires a rotation of 37.5°. Therefore, the rotary speed of this annular rotary flow controller is reduced from that of the rotary flow controller 10 of FIG. 1 if a combustion frequency of 100 Hertz is maintained. The difference in rotational velocity translates into different blade angles.

It is understood that the invention is not limited to the specific embodiments herein illustrated and described, but may be used in other ways without departing from its spirit. Other embodiments of the rotary flow controller described above that suggest themselves to those skilled in the art. For example, either of the rotary flow controllers described above may be used to control airflow from a freestream source, rather than airflow from a high-speed diffuser. Many other modifications can also be made within the scope of this invention, which is defined by the following claims.

We claim:

1. A rotary inlet flow controller for use with a pulse detonation engine, the rotary inlet flow controller having one or more blades that define ducts extending through said controller from an inlet side of said controller to an exit side of said controller, said one or more blades defining aerodynamically designed surfaces so that at least a portion of said ducts provide a converging area so that the air flow is accelerated from the inlet side to the exit side of said controller.

2. A rotary flow controller according to claim 1, wherein at least one of said one or more blades has a propeller-like shape.

3. A rotary flow controller according to claim 1, wherein at least one of said ducts has an entrance to exit area ratio of about 2.0.

4. A rotary flow controller according to claim 1, wherein the cross-sectional area of the inlet of said ducts is substantially equal to the cross sectional area of said controller, and the cross sectional area of the outlet of said ducts is less than the cross-sectional area of the said controller.

5. A rotary flow controller according to claim 1, wherein the sum of the cross-sectional areas of the outlets of said ducts is less than the cross-sectional area of the exit side of said controller.

6. A rotary flow controller according to claim 1, wherein the one or more blades of the rotary flow controller further comprise a downstream surface having a flat surface sized to seal the entrance to a combustion chamber of the pulse detonation engine.

7. A rotary flow controller according to claim 1, wherein the rotary flow controller is an annulus comprising inner and outer circular cylinders, said blades being mounted between said cylinders and defining several of said airflow ducts between said blades and said cylinders.

8. A rotary flow controller according to claim 7 wherein said annulus is mounted on spokes from a center.

9. A rotary flow controller according to any of claims 1, 2 and 7 wherein said one or more blades are swept.

10. A pulse detonation engine comprising:

a rotary flow controller having one or more propeller-like blades that define ducts extending through said controller from an inlet side of said controller to an exit side of said controller, whereby said blades aerodynamically control the flow of fluid to inlet ports of two or more combustion chambers.

11. A pulse detonation engine according to claim 10, wherein at least a portion of one of said ducts provides a converging area.

12. A pulse detonation engine according to claim 10 wherein the fluid flow is accelerated from the inlet side of the controller to the exit side.

13. A pulse detonation engine according to claim 10 wherein the fluid flows continuously through said rotary controller.

14. A pulse detonation engine according to claim 10 wherein at least one of the blades further comprises a downstream surface having a flat sealing surface sized to seal the entrance to a combustion chamber of the pulse detonation engine.

15. A pulse detonation engine according to claim 10 wherein said one or more blades function to compress the fluid flow.

16. A rotary flow controller according to claim 1, wherein the sum of the cross sectional areas of the inlet openings of said open ducts is substantially equal to the cross sectional area of the inlet side of said controller.

17. The rotary flow controller of claim 1 wherein the fluid flows continuously through the rotary flow controller.

18. The rotary flow controller of claim 1 wherein the one or more blades have an aerodynamic shape so that the fluid flow is compressed by the rotary flow controller.

19. The rotary flow controller of claim 1 wherein the one or more blades are swept forward.

20. A pulse detonation engine according to claim 10 wherein said one or more blades are swept forward.

21. A pulse detonation engine according to claim 10 further including an inlet upstream of said rotary flow controller, wherein the total inlet area of the rotary flow controller is substantially the same as the downstream exit area of said inlet.

22. A pulse detonation engine comprising:

an inlet, a rotary flow controller downstream of said inlet and having one or more blades that define ducts extending through said controller from an inlet side of said controller to an exit side of said controller, and two or more combustion chambers in fluid communication with said ducts, said ducts continuously flowing fluid through said rotary controller to said one or more combustion chambers.

23. The pulse detonation engine of claim 22 wherein at least a portion of said open ducts provide a converging area so that the air flow is accelerated from the inlet side to the exit side of said controller.

24. The pulse detonation engine of claim 22 wherein said blades are propeller-shaped.

* * * * *